(12) United States Patent
Beecher et al.

(10) Patent No.: US 9,393,716 B2
(45) Date of Patent: Jul. 19, 2016

(54) DEVICE AND METHOD OF CORRECTING EXTRUDATE BOW

(71) Applicant: Corning Incorporated, Corning, NY (US)

(72) Inventors: Kevin John Beecher, Corning, NY (US); Jeffrey Owen Foster, Horseheads, NY (US); Gilbert Franklin Gordon, III, Blacksburg, VA (US); Kevin Bruce Sterner, Christiansburg, VA (US); David Robertson Treacy, Jr., Horseheads, NY (US)

(73) Assignee: Corning Incorporated, Corning, NY (US)

( * ) Notice: Subject to any disclaimer, the term of this patent is extended or adjusted under 35 U.S.C. 154(b) by 442 days.

(21) Appl. No.: 14/061,129

(22) Filed: Oct. 23, 2013

(65) Prior Publication Data

US 2015/0108680 A1     Apr. 23, 2015

(51) Int. Cl.
| | |
|---|---|
| *B28B 3/26* | (2006.01) |
| *B29C 33/00* | (2006.01) |
| *B29C 47/00* | (2006.01) |
| *B29C 47/08* | (2006.01) |
| *B29C 47/12* | (2006.01) |
| *B29C 47/70* | (2006.01) |
| *B29L 22/00* | (2006.01) |

(52) U.S. Cl.
CPC .............. *B28B 3/2672* (2013.01); *B28B 3/269* (2013.01); *B29C 33/0061* (2013.01); *B29C 47/0028* (2013.01); *B29C 47/0811* (2013.01); *B29C 47/0816* (2013.01); *B29C 47/124* (2013.01); *B29C 47/705* (2013.01); *B29C 2947/926* (2013.01); *B29C 2947/92904* (2013.01); *B29L 2022/005* (2013.01)

(58) Field of Classification Search
CPC .......................... B29C 47/0811; B28B 3/2672
See application file for complete search history.

(56) References Cited

U.S. PATENT DOCUMENTS

| | | | | |
|---|---|---|---|---|
| 4,364,888 | A | * 12/1982 | Levin | ...................... B28B 3/206 264/177.12 |
| 6,039,908 | A |   3/2000 | Brew et al. | ................ 264/177.12 |
| 6,663,378 | B2 | 12/2003 | Grover et al. | ............. 425/192 R |
| 6,991,448 | B2 |   1/2006 | Lubberts | ...................... 425/381 |

(Continued)

FOREIGN PATENT DOCUMENTS

| | | |
|---|---|---|
| JP | 5337917 A | 12/1993 |
| JP | 6134731 A | 5/1994 |
| WO | 2013/137346 A1 | 9/2009 |

OTHER PUBLICATIONS

Oct. 20, 2014 International Search Report issued in counterpart application No. PCTUS2014/061284.

*Primary Examiner* — Benjamin Schiffman
(74) *Attorney, Agent, or Firm* — Charles A. Greene

(57) ABSTRACT

Disclosed apparatus and method to extrude a honeycomb, providing correction in bowing of the extruded honeycomb structure, employs a deflector device having a base plate including an opening aligned in a direction parallel to the extrusion axis through which the plastic material is conveyed to the die. The deflector device includes a bow plate movably mounted to the downstream or upstream side of the base plate. The bow plate includes a constant area aperture. The deflector device positioned upstream of extrusion die imparts a degree of bow reduction by the position of the constant area aperture over the opening imparting a pressure drop gradient on the flow stream entering the die.

13 Claims, 12 Drawing Sheets

(56) References Cited

U.S. PATENT DOCUMENTS

| | | | |
|---|---|---|---|
| 8,211,343 B2 | 7/2012 | Dheur et al. | 264/177.16 |
| 8,348,659 B2 | 1/2013 | Foster et al. | 425/464 |
| 2004/0164464 A1 | 8/2004 | Lubberts et al. | 264/630 |
| 2004/0197434 A1 | 10/2004 | Lubberts et al. | 425/380 |
| 2011/0291319 A1 | 12/2011 | Avery et al. | 264/177.12 |
| 2013/0200542 A1 | 8/2013 | Yoshino | 264/39 |

* cited by examiner

“canning” of these ceramic honeycombs in suitable metal
DEVICE AND METHOD OF CORRECTING EXTRUDATE BOW

BACKGROUND

1. Field

Exemplary embodiments of the present disclosure relate to extrusion of plastic batches, and more particularly to a device and method for overcoming the problem of bow in a honeycomb extrudate.

2. Discussion of the Background

Ceramic honeycombs for gasoline and diesel exhaust treatment applications can be produced by cutting and firing individual pieces from a stream of honeycomb extrudate, or by cutting the pieces from a dried green or fired ceramic "log" of extrudate which may be of meter or greater length. To meet customer requirements for the subsequent catalyst coating and "canning" of these ceramic honeycombs in suitable metal enclosures, it is important that the logs and pieces cut from the logs have sides which are straight and parallel.

The production of a straight stream of extruded material can be difficult; in most cases at least some "bowing" of the extrudate, attributable to uneven flow of material through the extrusion die, is observed. This bowing can be caused by non-uniform flow characteristics in the batch, but more commonly is due to uneven flow resistance across the face of the extrusion die. Even with careful attention to die fabrication, uneven machining resulting from facts such as progressive tool wear, misalignment of feed holes and discharge slots, and non-uniform exposure to chemical machining and/or plating electrolytes can result in at least some bowing tendency being "built in" to most honeycomb extrusion dies during manufacture.

The above information disclosed in this Background section is only for enhancement of understanding of the background of the disclosure and therefore it may contain information that does not form any part of the prior art nor what the prior art may suggest to a person of ordinary skill in the art.

SUMMARY

Exemplary embodiments of the present disclosure provide a bow deflector device.

Exemplary embodiments of the present disclosure also provide a honeycomb extrusion apparatus comprising the bow deflector device.

Exemplary embodiments of the present disclosure also provide a method for forming a honeycomb structure using the bow deflector device.

Additional features of the disclosure will be set forth in the description which follows, and in part will be apparent from the description, or may be learned by practice of the disclosure.

An exemplary embodiment discloses a bow deflector device positioned upstream of an extrusion die, the bow deflector device includes a base having an aperture of a first constant area to pass a feed stream of plastic batch material therethrough. A bow plate is movably mounted to a downstream or upstream side of the base. The bow plate includes an opening of a second constant area less than the first constant area to pass the feed stream of plastic batch material therethrough. By adjusting the bow plate position on the base, bow in a honeycomb extrudate extruded from the extrusion die can be corrected in any direction to "true zero" magnitude.

An exemplary embodiment also discloses a method for forming a honeycomb structure. The method includes providing a plastic batch material, directing a feed stream of the plastic batch material along an extrusion path through a bow deflector device. The bow deflector device includes a base having an aperture of a first constant area to pass the feed stream of plastic batch material therethrough, and a bow plate movably mounted to a downstream or upstream side of the base, the bow plate comprising an opening of a second constant area less than the first constant area to pass the feed stream of plastic batch material therethrough. By passing through the bow deflector device a unique flow velocity is superimposed on the feed stream of plastic batch material, as determined by the diameter of the opening, and the position of the opening. The method directs the feed stream of plastic batch material with the superimposed flow velocity through a honeycomb extrusion die, wherein the superimposed flow velocity corrects bow in any direction to "true zero" magnitude.

It is to be understood that both the foregoing general description and the following detailed description are exemplary and explanatory and are intended to provide further explanation of the disclosure.

BRIEF DESCRIPTION OF THE FIGURES

The accompanying drawings, which are included to provide a further understanding of the disclosure and are incorporated in and constitute a part of this specification, illustrate exemplary embodiments of the disclosure, and together with the description serve to explain the principles of the disclosure.

DETAILED DESCRIPTION

Figure 1:
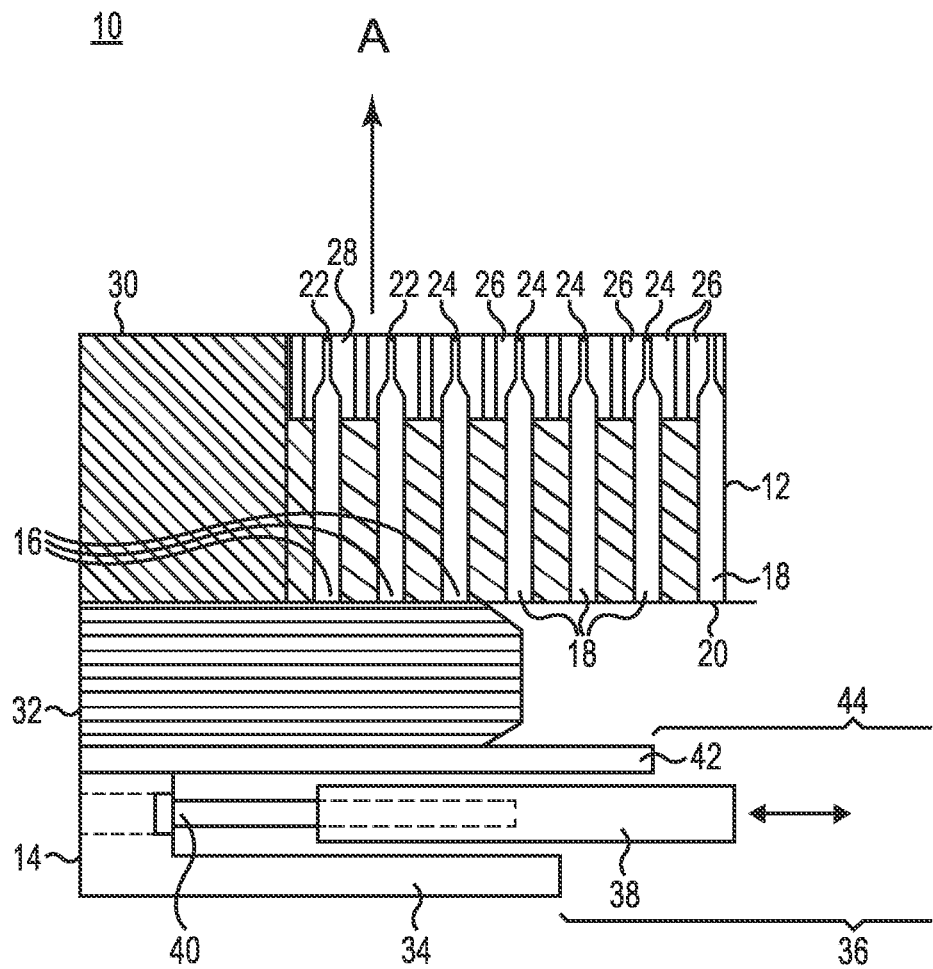
FIG. 1 presents a sectional view showing a die, a skin-forming member, and an extrudate bow corrector.

The disclosure is described more fully hereinafter with reference to the accompanying drawings, in which exemplary embodiments of the disclosure are shown. This disclosure may, however, be embodied in many different forms and should not be construed as limited to the exemplary embodiments set forth herein. Rather, these embodiments are provided so that this disclosure is thorough, and will fully convey the scope of the disclosure to those skilled in the art. In the drawings, the size and relative sizes of layers and regions may be exaggerated for clarity. It will be understood that when an element or layer is referred to as being "on", "connected to", or "adjacent to" another element or layer, it can be directly on, directly connected to, or directly adjacent to the other element or layer, or intervening elements or layers may be present. In contrast, when an element or layer is referred to as being "directly on", "directly connected to", or "directly adjacent to" another element or layer, there are no intervening elements or layers present. Like reference numerals in the drawings denote like elements. It will be understood that for the purposes of this disclosure, "at least one of X, Y, and Z" can be construed as X only, Y only, Z only, or any combination of two or more items X, Y, and Z (e.g., XYZ, XYY, YZ, ZZ).

FIG. 1 shows a cross section of a honeycomb extrusion apparatus 10 that includes a die 12 and an extrudate bow corrector 14. Examples of extrudate bow corrector devices for correcting bow in a stream of extruded material are provided in U.S. Pat. No. 6,663,378, issued Dec. 16, 2003, and U.S. patent application having Ser. No. 10/370,840 and Publication No. 2004-0164464, published Aug. 26, 2004, both of which are hereby incorporated by reference in their entirety as if fully set forth herein. The die 12 is composed of peripheral feed holes 16 and central feed holes 18 communicating at one end with an inlet face 20, and at the other end with a plurality of interconnected peripheral discharge slots 22 and central discharge slots 24, forming central pins 26 and peripheral pins 28 at an outlet face 30.

The extrudate bow corrector 14 is positioned upstream of the die 12, adjacent an optional peripheral feed flow device 32. Examples of peripheral feed flow devices are provided in U.S. Pat. No. 6,991,448, issued Jan. 31, 2006, which is hereby incorporated by reference in its entirety as if fully set forth herein. The extrudate bow corrector 14 includes a base 34 having an aperture 36 (partially shown) sufficiently large for the batch material to pass therethrough. A plurality of adjustable plates 38 movably mounted to the base 34 may be provided, each adjustable plate 38 capable of being moved independently of the others at bolt 40, such that when the adjustable plates are adjusted to varying positions a correction is simultaneously effected in the direction and magnitude of a bow in a honeycomb extrudate. A cover 42 may also be provided on the bow corrector 14, the cover 42 being comparable size and shape to the base 34. The cover 42 acts to shield the adjustable plates 38, and can be securely mounted to the base 34. The cover 42 can mirror the base 34 in size and shape, and include an aperture 44 (partially shown) of equal or greater diameter to the base aperture 36.

Figure 2:
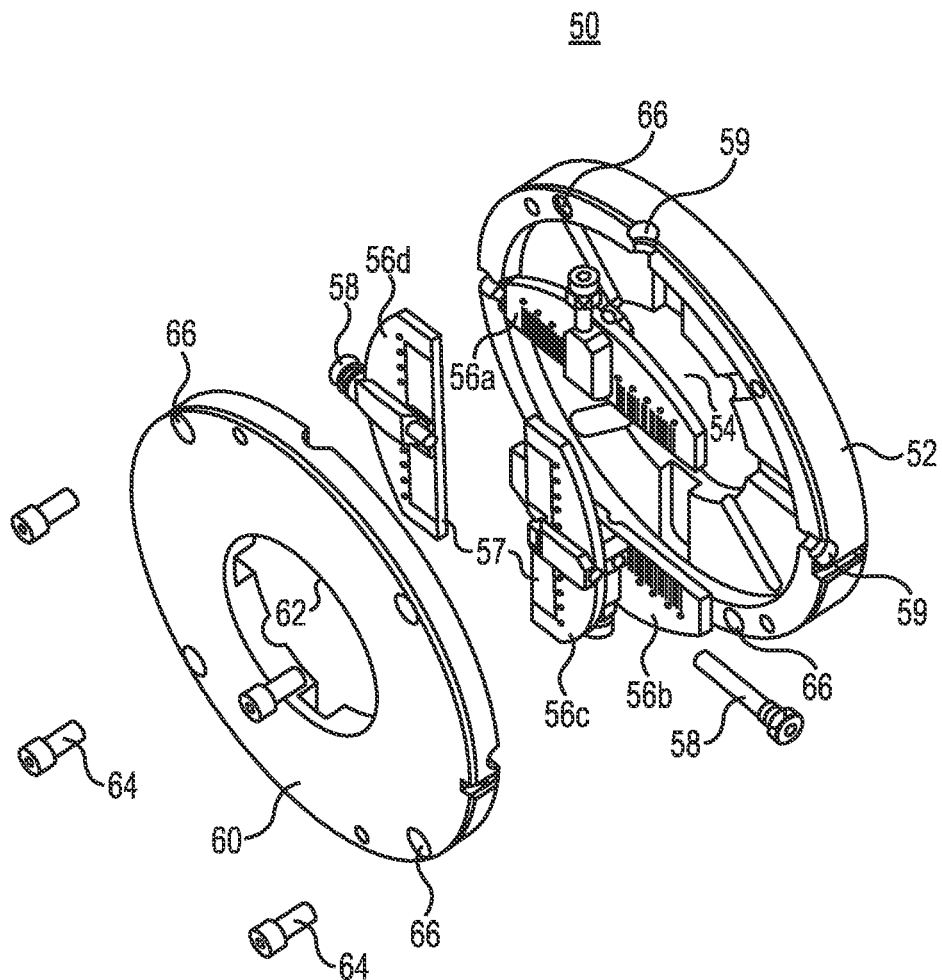
FIG. 2 presents a perspective view illustration of components of a bow deflector device according to the prior art.
Figure 3:
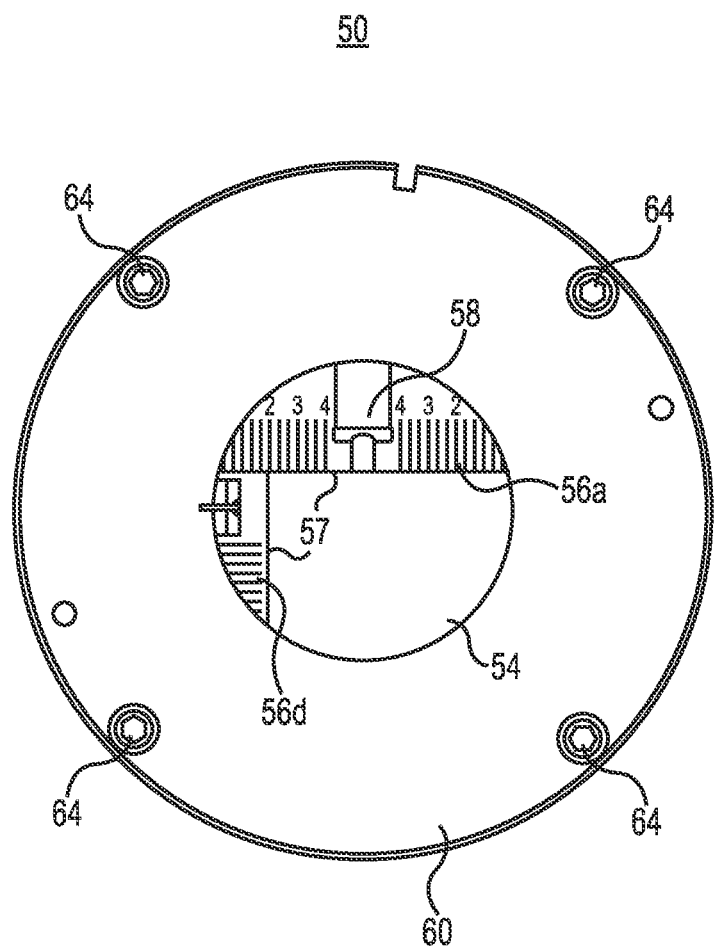
FIG. 3. is a front view of the bow deflector device of FIG. 2.

FIG. 2 and FIG. 3 illustrate a perspective view and a front view, respectively, of a bow deflector device 50. In the provided drawings bow deflector device 50 includes a base 52 having an aperture 54 through which flow of a plasticized batch or extrudate is attained. Further, a plurality of adjustable plates 56 are movably mounted to base 52. In FIG. 2, four adjustable plates (56a-d) are shown. The adjustable plates have at least one straight edge 57 adjacent the base aperture 54.

Bolts 58 located on each adjustable plate 56a-d, control the movement of the adjustable plates. By designing the movement of the adjustable plates 56a-d to be possible for an "in-and-out" motion, the adjustable plates 56a-d can be externally manipulated at openings 59. This allows for external manipulation during production without interruption thereof. The plates 56a-d may be adjusted mechanically, for example by screws 58 as illustrated in FIG. 2, or pneumatically or by a hydraulic device (not shown). Each adjustable plate 56a-d is independent in movement from the others. Changing the positions of one or more of the adjustable plates 56a-d, not only affects the direction, but also the magnitude of bowing that can be corrected.

The degree of bow correction flexibility is dictated by the aperture 54 in base 52. In the maximum-correction position the adjustable plates 56a-d are moved to reduce the diameter of the aperture 54 to the smallest possible opening. In the minimum-correction position the adjustable plates 56a-d are moved to allow for the maximum diameter of aperture 54.

The position of the adjustable plates 56a-d can be selected to achieve desired magnitude of bow correction, in any direction. For example, referring to FIG. 3, plates 56a, and 56d are adjusted to an intermediate position to correct down and right bow for a predetermined degree of bow correction. The deflector device can include a cover 60 which overlays the adjustable plates 56a-d, and is securely mounted to base 52. The mounting is attained with dowel pins 64 at corresponding holes 66 on both the base 52 and cover 60. Cover 60 is also provided with an aperture 62, having a diameter of equal to or greater than the diameter of aperture 54 on the base 52.

The bow deflector device 50 having the adjustable plates 56a-d is relatively effective at general bow control, but can drive other attributes, particularly shape due to the "choking off" the flow in a non-uniform manner, and changing both the size and shape of the batch flow going to the back of the die 12 (FIG. 1).

Figure 4:
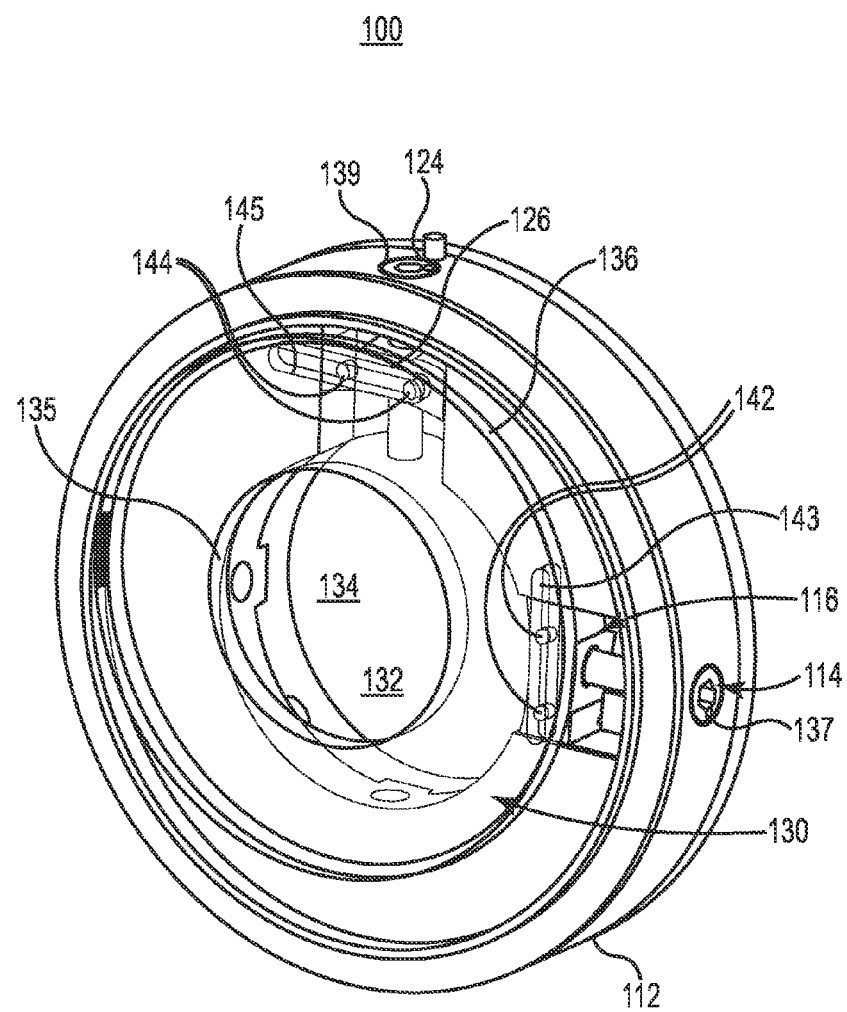
FIG. 4. is a perspective view of the components of a bow deflector device according to exemplary embodiments of the disclosure.

FIG. 4 illustrates a perspective view of a bow deflector device according to exemplary embodiments of the disclosure. The bow deflector device 100 in FIG. 4 can include a base 112, a horizontal adjustment member 114, a horizontal connector 116, a vertical adjustment member 124, a vertical connector 126, and a bow plate 130.

The bow deflector base 112 has an aperture 132 through which flow of a plasticized batch or extrudate is attained. The bow plate 130 is movably mounted to base 112. The bow plate 130 may be movably mounted to the downstream or upstream side of the base 112. The bow plate 130 has an opening 134 defined by edge 135 adjacent the base aperture 132. The opening 134 can be directly adjacent the base aperture 132. The opening 134 is a constant area and can be the same shape as the product being extruded. The opening 134 can be of the same or different size of the aperture 132, for example, the opening 134 can be smaller in size than the aperture 132. The bow plate 130 blocks extrudate flow except extrudate flow through opening 134.

Horizontal adjustment member 114 located on a side of the base 112, controls a horizontal movement of the bow plate 130. The horizontal adjustment member 114 can be connected to a side of the bow plate 130 by a horizontal connector 116. For example, the horizontal adjustment member 114 may be a bolt and the horizontal connector 116 may be a rider block. In another example, the horizontal adjustment member 114 may be a bolt that pushes directly on outer peripheral edge 136 of bow plate 130. Vertical adjustment member 124 located on a top of the base 112 in FIG. 4, controls a vertical movement of the bow plate 130. The vertical adjustment member 124 can be connected to a top of the bow plate 130 by a vertical connector 126. For example, the vertical adjustment member 124 may be a bolt and the vertical connector 126 may be a rider block. In another example, the vertical adjustment member 124 may be a bolt that pushes directly on outer peripheral edge 136 of bow plate 130. The horizontal and vertical adjustment members 114, 124 can be externally manipulated at openings 137, 139, respectively. This allows for external manipulation during production without interruption thereof. The adjustment members 114, 124 may be adjusted mechanically, for example rotation of screw threads on bolts as illustrated in FIG. 4, or by pneumatic or hydraulic devices (not shown).

While terms, top, side, vertical, and horizontal are used, the disclosure is not so limited to these exemplary embodiments. Instead, spatially relative terms, such as "top", "bottom", "horizontal", "vertical", "side", "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly. Thus, the exemplary term "side" can become "top" and vice versa when the bow deflection device 100 in FIG. 4 is rotated 90 degrees counter clockwise.

The horizontal and vertical connectors 116, 126 connect to the side and top of the bow plate, respectively, to move the plate in response to in-and-out movement of horizontal and vertical adjustment members 114, 124. Alternatively, as described above, the horizontal and vertical connectors 116, 126 can be omitted and the horizontal and vertical adjustment members 114, 124 can contact the bow plate 130 directly, such as, by pushing on peripheral edge 136. The horizontal connector 116 can be connected to the bow plate 130 by fastener pins 142 in vertical slot 143 and the vertical connector 126 can be connected to the bow plate 130 by fastener pins 144 in horizontal slot 145. Movement of horizontal adjusting member 114 in-and-out relative to center of aperture 132 of the base 112 in opening 137, causes fastener pins 142 in vertical slot 143 to correspondingly move bow plate 130 in a horizontal direction. When bow plate 130 moves in a horizontal direction, fastener pins 144 move in horizontal slot 145 of the bow plate 130, for example, fastener pins 144 may slide in horizontal slot 145. When bow plate 130 moves in a horizontal direction, opening 134 moves in a horizontal direction.

Likewise, vertical adjustment member 124 movement in and out relative to center of aperture 132 of the base 112 in opening 139, causes fastener pins 144 in horizontal slot 145 to correspondingly move bow plate 130 in a vertical direction. When bow plate 130 moves in a vertical direction, fastener pins 142 move in vertical slot 143 of the bow plate 130, for example, fastener pins 142 may slide in vertical slot 143. When bow plate 130 moves in a vertical direction, opening 134 moves in a vertical direction. Accordingly, opening 134 can move horizontally and vertically relative to the base 112 while maintaining a constant opening size (area) and shape. Changing the position of opening 134, not only affects the direction, but also the magnitude of bowing that can be corrected.

It will be evident that the vertical adjustment member 124 and horizontal adjustment member 114 are orthogonal to one another to operably manipulate the opening 134 to positions relative to the base 112 aperture 132. However, the vertical adjustment member 124 and horizontal adjustment member 114 may be at various positions to one another to accomplish similar manipulations of the opening 134 to positions relative to the base 112 aperture 132.

The position of the bow plate 130 can be selected to achieve desired magnitude of bow correction, in any direction. For example, referring to FIG. 5, bow plate 130 is adjusted to an intermediate position to correct down and right bow for a predetermined degree of bow correction. The deflector device 100 can include a cover 150 which overlays the adjustable bow plate 130, and is securely mounted to base 112. The mounting is attained with dowel pins 154 at corresponding holes 156 on both the base 112 and cover 150. Cover 150 can also be provided with an aperture 152, having a diameter of equal to or greater than the diameter of aperture 132 on the base 112.

Figure 5:
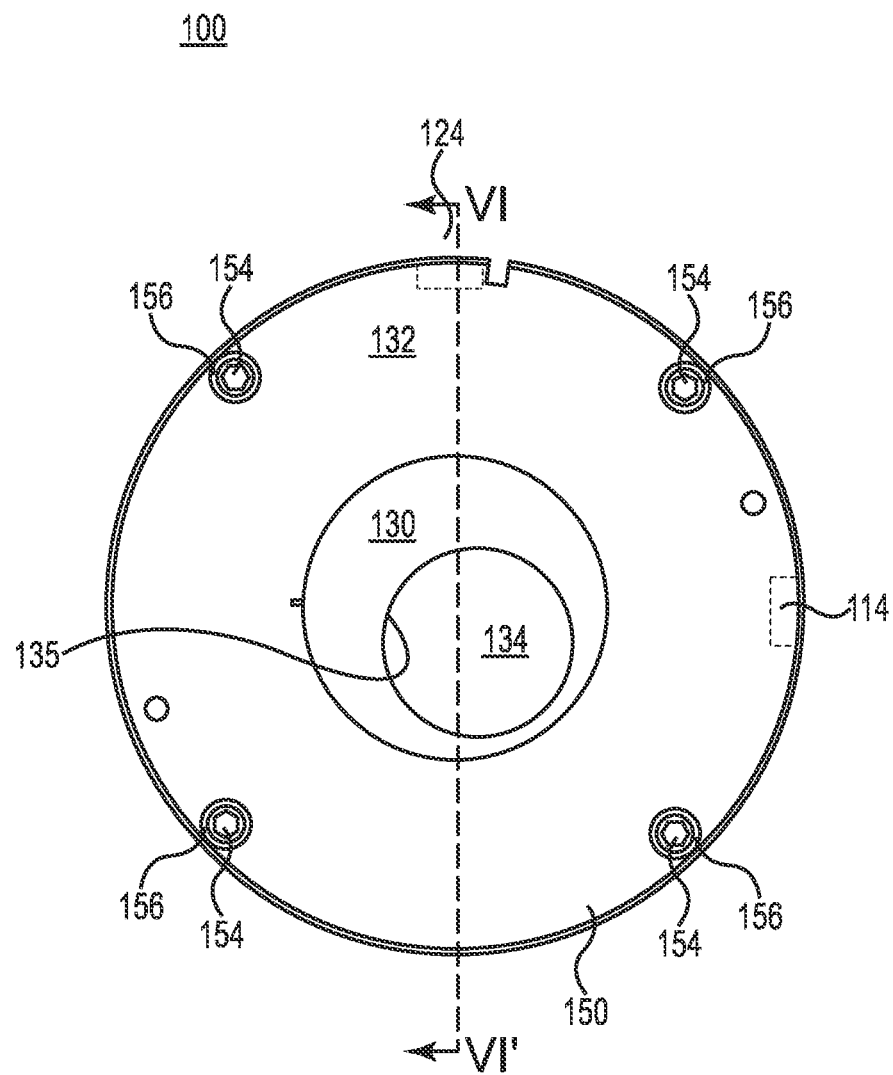
FIG. 5 is a front view of the bow deflector device of FIG. 4.
Figure 6:
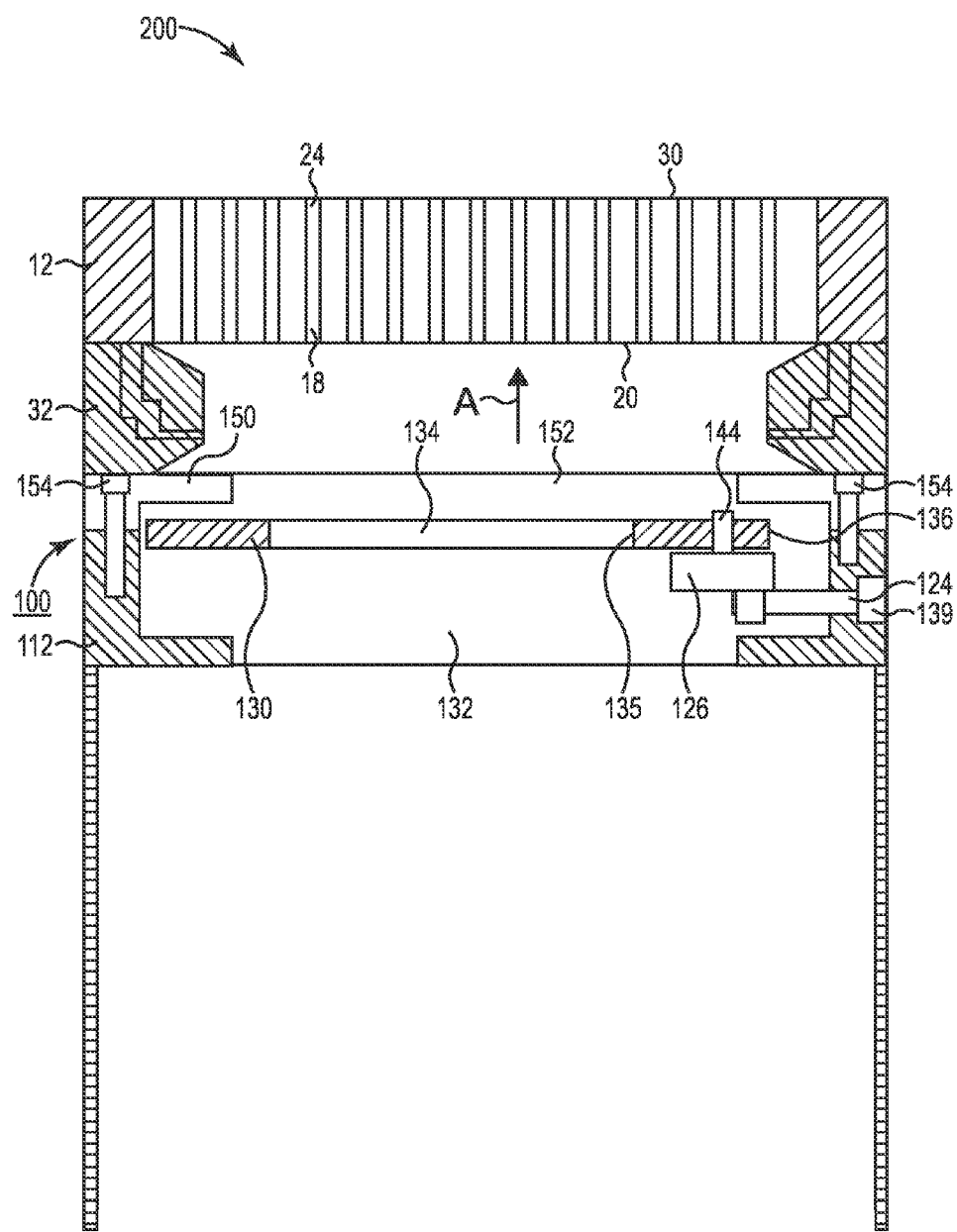
FIG. 6 is a cross sectional view of a honeycomb extrusion apparatus including the bow deflector device of FIG. 5 sectioned along line VI-VI'.

FIG. 6 shows a cross section view through the bow deflector device 100 of FIGS. 4 and 5. A batch flow direction is indicated by arrow "A". In operation the bow deflector device 100 can be positioned upstream of a honeycomb extrusion die 12 in an apparatus 200 for the extrusion of a honeycomb structure according to the present disclosure. The honeycomb extrusion die 12 employed in the apparatus has an inlet face 20 comprising a plurality of feed holes 18, and an outlet face 30 comprising discharge slots 24. The discharge slots 24 are configured to produce an extrudate of honeycomb configuration from a plastic batch flowing downstream through the die along an extrusion axis parallel with the direction of extrusion.

The extrudate flows through the bow deflector device 100 prior to entering and passing through the die 12. As the plastic batch flows through the die, it does so having a unique flow velocity superimposed thereon as determined by the peripheral edge 135 of the opening 134 of the bow plate 130, and the position of the opening 134. This flow velocity gradient counteracts preferential flow in the die, resulting in equal batch flow throughout the die. Therefore, as the honeycomb extrudate emerges from the die it is absent of any bow in any direction. The bow deflector device 100 can be directly adjacent the die 12 or other intervening extrusion hardware devices may be present, such as a flow control device. For example, in FIG. 6, peripheral feed flow device 32 is illustrated disposed between the bow deflector device 100 and the die 12.

Figure 7:
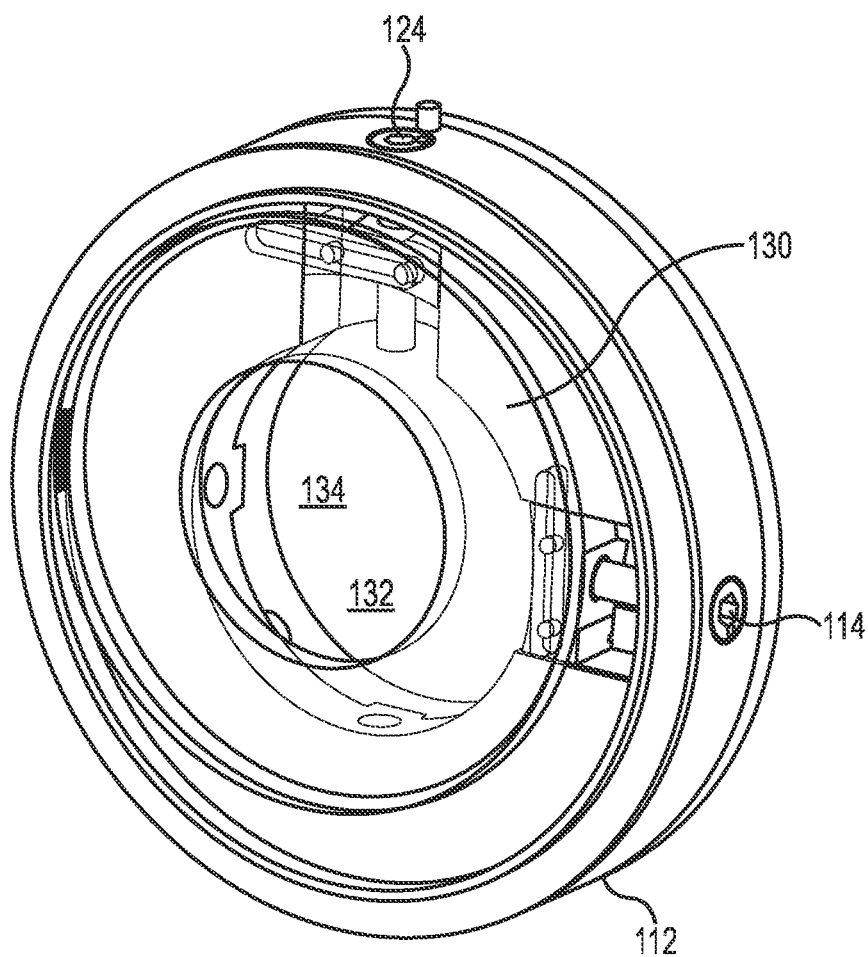
FIG. 7 is a perspective view of the bow deflector device of FIG. 4 illustrating the movable constant area opening of the bow plate in a top left position.
Figure 8:
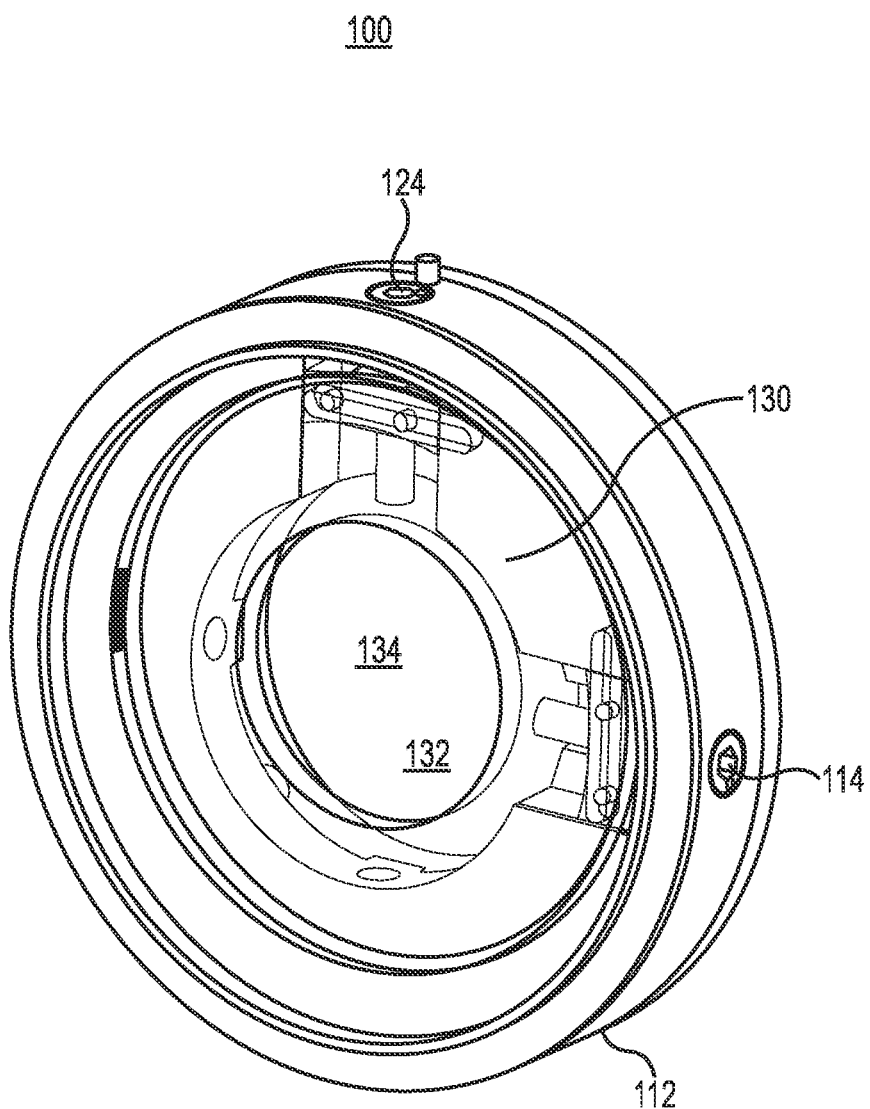
FIG. 8 is a perspective view of the bow deflector device of FIG. 4 illustrating the movable constant area opening of the bow plate in a top right position.
Figure 9:
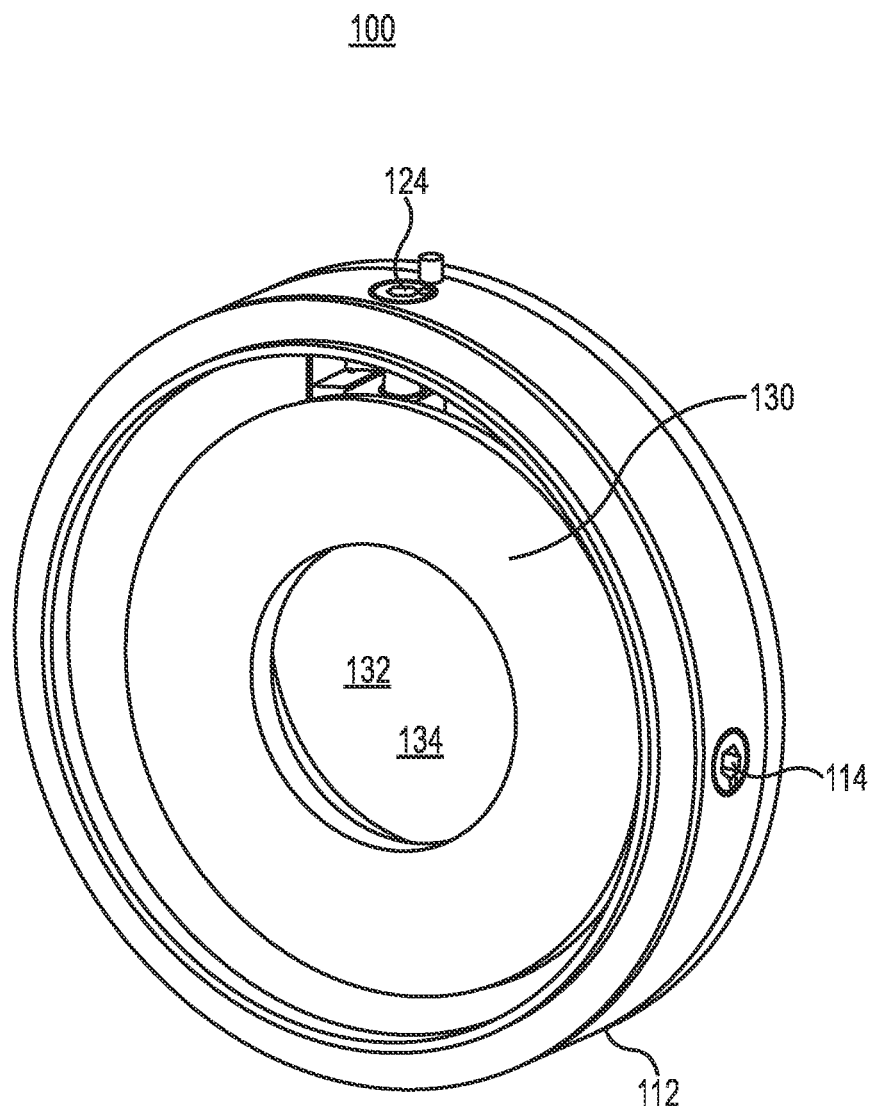
FIG. 9 is a perspective view of the bow deflector device of FIG. 4 illustrating the movable constant area opening of the bow plate in a center right position.
Figure 10:
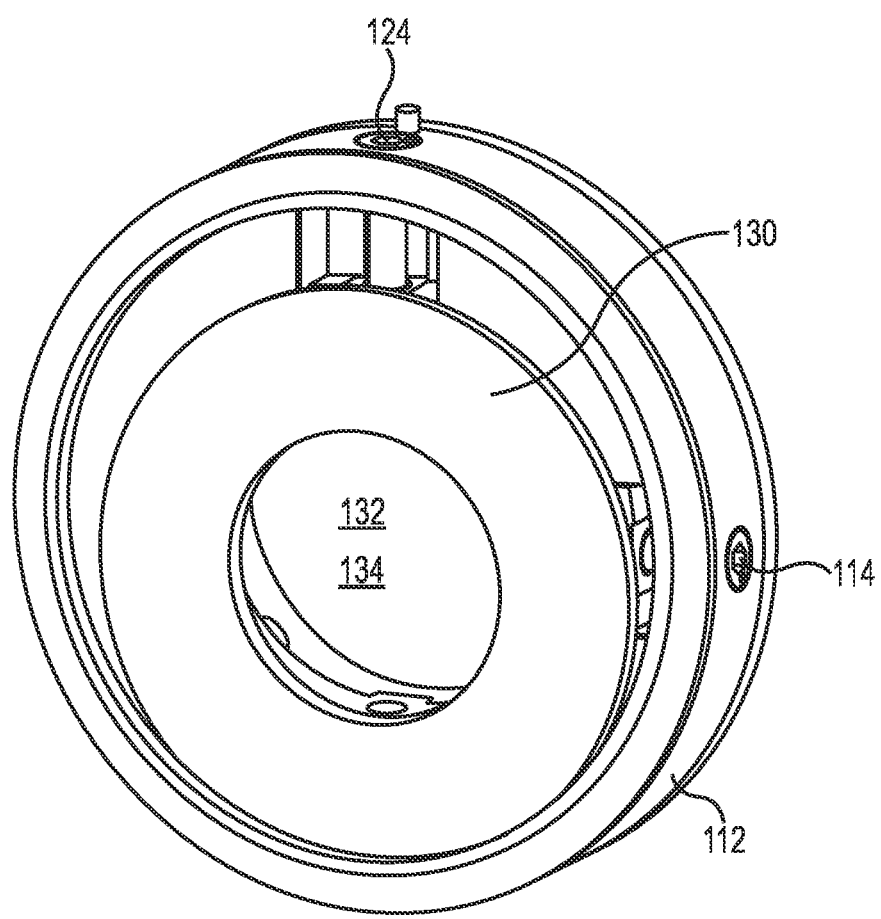
FIG. 10 is a perspective view of the bow deflector device of FIG. 4 illustrating the movable constant area opening of the bow plate in a bottom center position.

The bow plate 130 can move anywhere within the constraints of the base 112 by adjustment of vertical and horizontal adjustment members 114, 124. FIG. 7 shows the bow plate 130 and bow plate opening 134 in an upper left position to counter upper left bow in the extrudate. FIG. 8 shows the bow plate 130 and bow plate opening 134 in an upper right position to counter upper right bow in the extrudate. FIG. 9 shows the bow plate 130 and bow plate opening 134 in a right position and FIG. 10 shows the bow plate 130 and bow plate opening 134 in a bottom position to counter right bow and downward bow, respectively, in the extrudate. For example, the bow plate 130 and bow plate opening 134 can move to the positions shown in FIGS. 7 to 10 by turning bolts of the vertical and horizontal adjustment members 114, 124. When moved, the size and shape of the opening 134 remains unchanged.

The opening 134 can be positioned to provide the most effective flow correction as required to provide for a straight extrudate, to counter the issues that prevent it from being straight naturally, with minimal impact on cross sectional shape of the extrudate. For example, when the extrudate cross sectional shape is an ellipse, the opening 134 can be an ellipse, or when the extrudate cross sectional shape is a circle, the opening 134 can be a circle. The bow plate 130 being a unitary structure provides a constant area and constant shape opening 134 at all times according to these exemplary embodiments. For example, the unitary structure can be a single plate. For example, when the bow plate 130 moves from a first location in aperture 132 to a second location in aperture 132, and at all positions between the first location and the second location, opening 134 maintains a constant area and constant shape.

Figure 11:
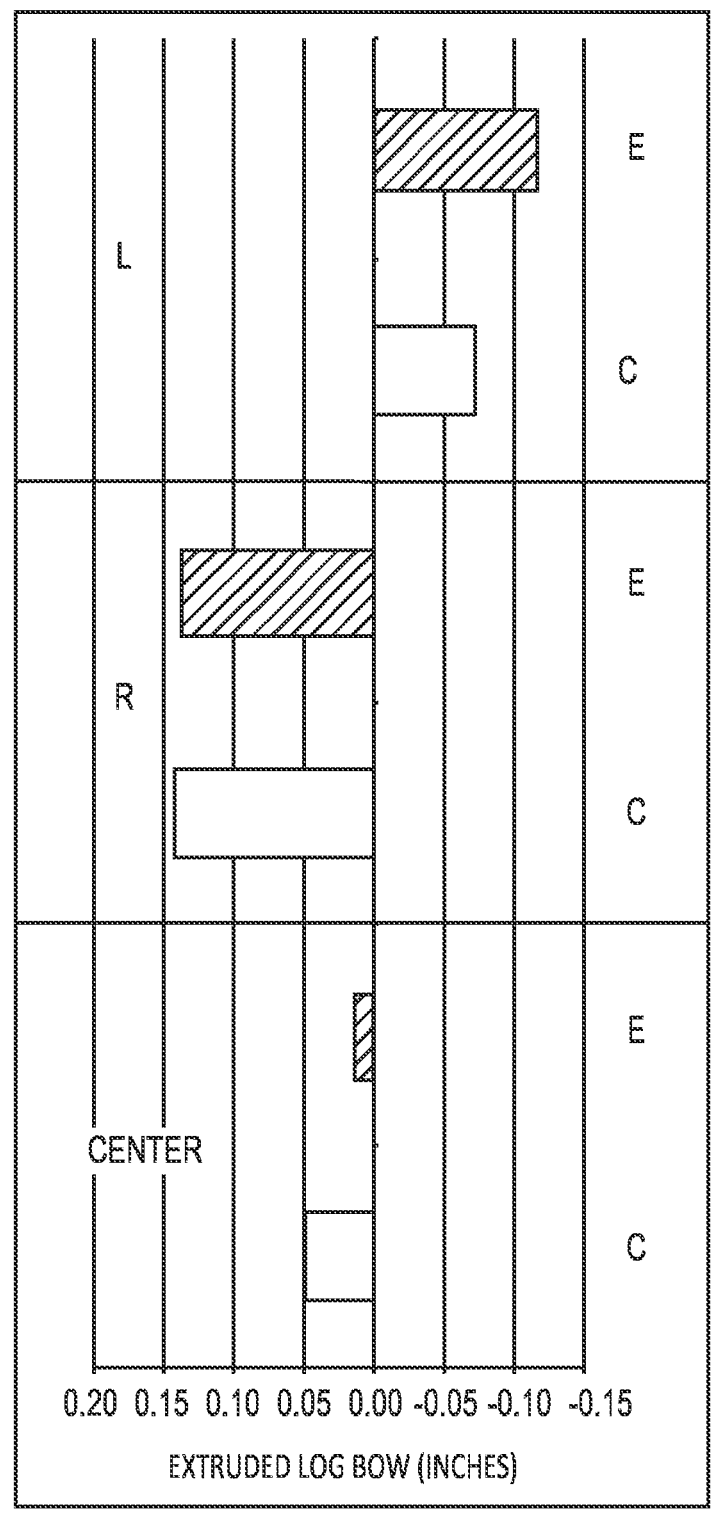
FIG. 11 shows a graph of data of bow movement resulting from plate movement in the Comparative deflector device and the deflector device according to the exemplary embodiments of the disclosure having a single orifice bow plate.

FIG. 11 shows a graph of data of bow movement resulting from plate movement in the Comparative deflector device 50 having shutter plates 56a-d (C) and the deflector device 100 according to the exemplary embodiments of the disclosure having a single orifice bow plate 130 (E) for left (L), right (R), and centered (Center) positions. The bow plate 130 having the constant area opening 134 provides as much or more bow control capabilities as the Comparative deflector device 50 having shutter plates 56a-d.

Figure 12:
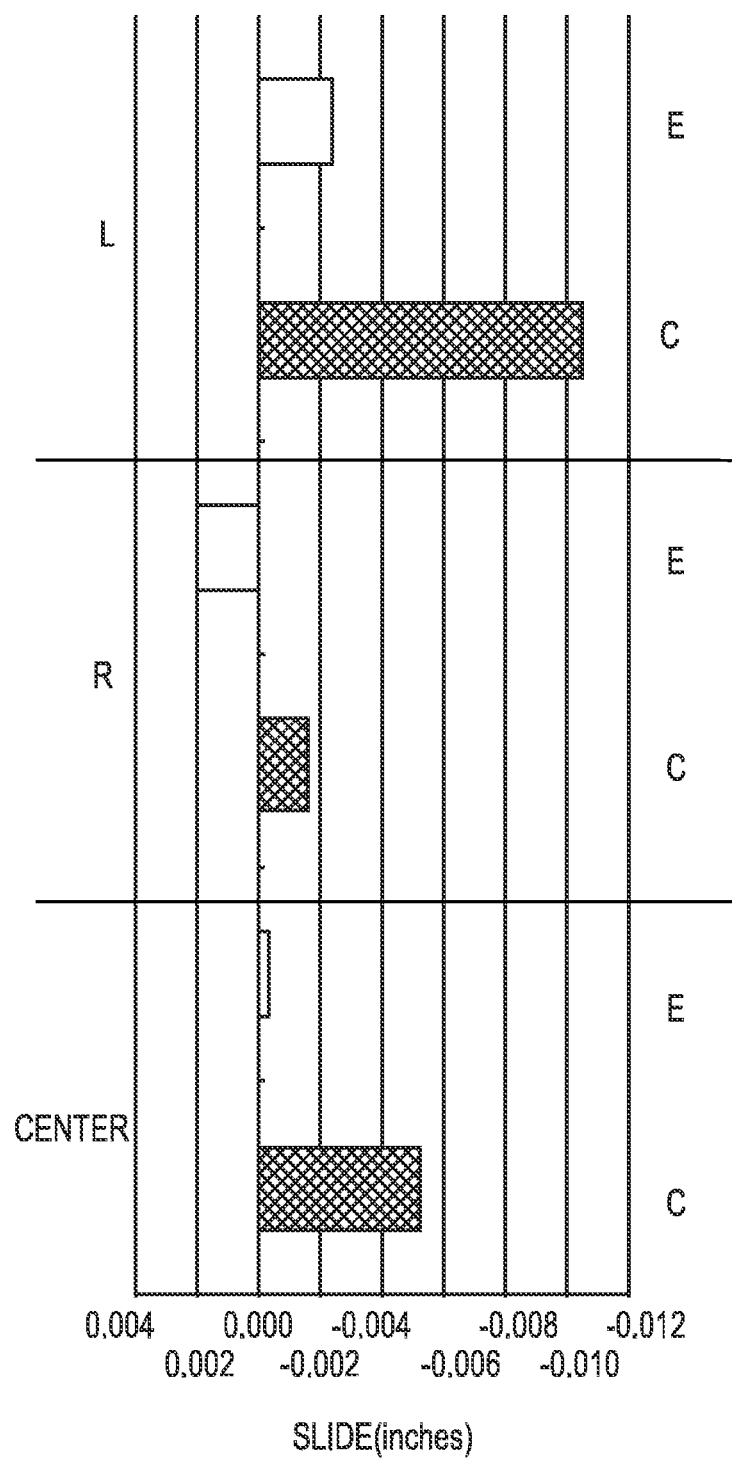
FIG. 12 shows a graph of data of slide (shape) resulting from plate movement in the Comparative deflector device having shutter plates and the deflector device according to the exemplary embodiments of the disclosure having a single orifice bow plate.

FIG. 12 shows a graph of data of slide (shape) resulting from plate movement in the Comparative deflector device 50 having shutter plates 56a-d (C) and the deflector device 100 according to the exemplary embodiments of the disclosure having a single orifice bow plate 130 (E). FIG. 12 shows the average slide left to right by condition. The testing was conducted to demonstrate impact of extruded body shape with plate movement. Centered (Center), maximum right (R) and maximum left (L) are shown. The bow plate 130 having the constant area opening 134 provides better slide ("nose" on one side of extruded part) for improved shape capability.

Advantages of the extrusion apparatus provided in accordance with the present disclosure include: (1) correction of bow in any direction to true "zero" magnitude; (2) bow correction during the manufacturing process without interruption in production due to "external manipulation" design in the bow deflector device; (3) reduction of swollen webs in peripheral zone of extruded honeycomb substrates; (4) compatible with extrusion of thin and ultra-thin honeycomb substrates; (5) reduction in preferential flow in conventional dies; (6) reduction in hardware costs; and, (7) increased product output as a result of decreasing bow-related failure.

According to exemplary embodiments of the disclosure, further advantages include: (8) simpler and easier to assemble hardware; (9) reduction in control (adjustment) members from one at each 90 degree position to only a side and top control making the bow deflector device both simpler to operate and safer since these control locations can be positioned at the easiest locations to access; (10) elimination of joints between individual shutter plates, the bow plate virtually eliminates joints as a source of leakage; (11) allows more movement flexibility for 2-directional bow control because the bow plate can move opening into the 45 regions as needed; (12) ease of tracking opening movement (position of opening), for example, because two controls instead of four that can lead to more direct automation of bow control movement and improved bow control via faster reaction and incremental movement; (13) ease of disassembly and cleaning; (14) easily add to existing extrusion hardware designs with less cost; (15) avoids impact on extrudate shape by avoiding the "choking off" of the flow in a non-uniform manner; and (16) maintains constant size and shape of the batch flow going to the back of the die.

It will be apparent to those skilled in the art that various modifications and variations can be made in the present disclosure without departing from the spirit or scope of the disclosure. Thus, it is intended that the appended claims cover the modifications and variations of this disclosure provided they come within the scope of the appended claims and their equivalents.

The invention claimed is:

1. A bow deflector device positioned upstream of an extrusion die, the bow deflector device comprising:
   a base comprising an aperture of a first constant area to pass a feed stream of plastic batch material therethrough;
   a bow plate movably mounted to a downstream side of the base, the bow plate comprising an opening of a second constant area less than the first constant area to pass the feed stream of plastic batch material therethrough, wherein by adjusting the bow plate position on the base, bow in a honeycomb extrudate extruded from the extrusion die can be corrected in any direction to "true zero" magnitude.

2. The bow deflector device of claim 1, wherein the bow plate opening comprises a constant shape.

3. The bow deflector device of claim 1, wherein the bow plate opening comprises a constant shape that matches a cross sectional shape of a honeycomb body extruded from the die.

4. The bow deflector device of claim 3, wherein the bow plate opening area is less than a cross sectional area of the honeycomb body extruded from the die.

5. The bow deflector device of claim 1, wherein the bow plate opening comprises a movable constant area opening.

6. The bow deflector device of claim 1, wherein the bow plate opening comprises a constant shape of a circle or an ellipse.

7. The bow deflector device of claim 1, wherein the bow plate opening is defined by a single curved edge within the bow plate.

8. The bow deflector device of claim 1, wherein the bow plate is a unitary structure.

9. The bow deflector device of claim 1, further comprising:
   a horizontal adjustment member to move the bow plate horizontally on the base; and
   a vertical adjustment member to move the bow plate vertically on the base, wherein the horizontal adjustment member and vertical adjustment member are configured to move the bow plate opening to overlap regions of the base aperture.

10. A honeycomb extrusion apparatus comprising the bow deflector device of claim 1 in combination with a honeycomb extrusion die having an inlet face comprising feed holes and an outlet face comprising a discharge opening, the discharge opening being configured to form a honeycomb extrudate from a stream of plastic material flowing on an extrusion axis through the die, wherein the bow deflector device is positioned adjacent to the inlet face of the extrusion die.

11. The extrusion apparatus of claim 10 further comprising an intervening extrusion hardware device disposed between the bow deflector device and the inlet face of the extrusion die.

12. A method for forming a honeycomb structure, comprising:
   providing a plastic batch material;
   directing a feed stream of the plastic batch material along an extrusion path through a bow deflector device comprising a base comprising an aperture of a first constant area to pass the feed stream of plastic batch material therethrough, and a bow plate movably mounted to a downstream or upstream side of the base, the bow plate comprising an opening of a second constant area less than the first constant area to pass the feed stream of plastic batch material therethrough, wherein by passing through the bow deflector device a unique flow velocity is superimposed on the feed stream of plastic batch material, as determined by the diameter of the opening, and the position of the opening; and, directing the feed stream of plastic batch material with the superimposed flow velocity through a honeycomb extrusion die, wherein the superimposed flow velocity corrects bow in any direction to "true zero" magnitude.

13. The method of claim 12, further comprising dynamically correcting bow in the extruded plastic batch material during extrusion comprising moving the bow plate on the base to move the bow plate opening, wherein the bow plate opening remains the second constant area during moving.

* * * * *